United States Patent
Suzuki et al.

(10) Patent No.: US 8,036,717 B2
(45) Date of Patent: Oct. 11, 2011

(54) MOBILE PHONE TERMINAL AND CHARGING SYSTEM

(75) Inventors: Katsuya Suzuki, Gunma (JP); Kuniharu Suzuki, Tokyo (JP); Akira Ikeuchi, Kanagawa (JP); Yoshihide Majima, Kanagawa (JP); Hirotsugu Iijima, Tokyo (JP); Kenichi Kasai, Kanagawa (JP); Takatoshi Itagaki, Hokkaido (JP)

(73) Assignees: Sony Ericsson Mobile Communications Japan, Inc, Tokyo (JP); Mitsumi Electric Co., Ltd., Tama-shi (JP)

( * ) Notice: Subject to any disclaimer, the term of this patent is extended or adjusted under 35 U.S.C. 154(b) by 419 days.

(21) Appl. No.: 12/262,727

(22) Filed: Oct. 31, 2008

(65) Prior Publication Data

US 2009/0124299 A1   May 14, 2009

(30) Foreign Application Priority Data

Nov. 9, 2007   (JP) .................................. 2007-292492

(51) Int. Cl.
*H04M 1/38* (2006.01)
(52) U.S. Cl. ........ 455/573; 320/116; 320/134; 320/136; 320/153
(58) Field of Classification Search .................. 320/116, 320/134, 136, 150, 153; 455/573
See application file for complete search history.

(56) References Cited

U.S. PATENT DOCUMENTS

| 5,582,928 | A | * | 12/1996 | Farley | 429/7 |
| 5,870,025 | A | * | 2/1999 | Hinohara | 340/636.12 |
| 6,577,883 | B1 | * | 6/2003 | Ueda | 455/573 |
| 2003/0098679 | A1 | * | 5/2003 | Odaohhara | 323/284 |
| 2005/0112416 | A1 | * | 5/2005 | Sakakibara | 429/9 |

FOREIGN PATENT DOCUMENTS

JP   2006-155922   6/2006

* cited by examiner

*Primary Examiner* — Kent Chang
*Assistant Examiner* — Dinh Nguyen
(74) *Attorney, Agent, or Firm* — Oblon, Spivak, McClelland, Maier & Neustadt, L.L.P.

(57) ABSTRACT

Disclosed is a mobile terminal incorporating a battery pack utilized as power supply. The mobile terminal includes a positive terminal connected to a battery pack positive electrode, a negative terminal connected to a battery pack negative electrode, a data communication terminal communicating with a circuit in the battery pack, a charge control unit controlling charging of the battery pack via the positive terminal, and a reference voltage output unit outputting reference voltage. The terminal further includes a dividing resistor and a thermistor connected in series between the reference voltage output unit and the negative terminal, a temperature detector detecting temperature, and stopping charging of the battery pack based on the detected temperature, and a switching device controlling the voltage at the predetermined portion. The terminal still further includes a control unit communicating with the circuit in the battery pack via the data communication terminal, and changing the voltage at the predetermined portion when notified abnormality from the battery pack.

4 Claims, 7 Drawing Sheets

US 8,036,717 B2

MOBILE PHONE TERMINAL AND CHARGING SYSTEM

CROSS REFERENCES TO RELATED APPLICATIONS

The present invention contains subject matter related to Japanese Patent Application JP 2007-292492 filed in the Japanese Patent Office on Nov. 9, 2007, the entire contents of which being incorporated herein by reference.

BACKGROUND OF THE INVENTION

1. Field of the Invention

The invention relates to a mobile terminal such as a mobile phone terminal to which an intelligent battery pack can be attached as power supply, and a charging system including the mobile terminal having the intelligent battery pack. Specifically, the invention relates to technology for charging a battery pack via a mobile terminal.

2. Description of the Related Art

In the related art, a mobile phone terminal utilizing a lithium-ion rechargeable battery as power supply generally incorporates a temperature detecting device such as a thermistor inside the battery pack containing the lithium-ion rechargeable battery for detecting temperature anomaly, specifically, for detecting the temperature exceeding the ordinary operating temperature range to monitor the temperature of the battery while charging.

FIG. 1 is a block diagram illustrating electric connections between a related art battery pack 2 and a mobile phone terminal 240. As illustrated in the figure, the battery pack 2 includes a battery plus terminal 231, a battery minus terminal 233, and a thermistor 232. A battery cell 20 is connected between the battery plus terminal 231 and the battery minus terminal 233. A switch 22 controlling charge and discharge of the battery cell 20 is connected between the battery cell 20 and the battery minus terminal 233. The switch 22 is controlled by a protection unit 21. A thermistor 23 is connected between the battery minus terminal 233 and the thermistor terminal 232. In the electric connection described above, a resistance value at the thermistor 23 varies with the temperature inside the battery pack 2, based on which voltage of a signal obtained by the thermistor 232 will be changed. The mobile phone terminal 240 is configured to monitor the voltage of the signal obtained by the thermistor terminal 232 and the temperature inside the battery pack 2.

Next, a configuration of the mobile phone terminal 240 is described. The mobile phone terminal 240 has three terminals 241, 242, 243 connecting to terminals in the battery pack 2, respectively. The plus terminal 241 is connected to the battery plus terminal 231 in the battery pack 2. The minus terminal 242 is connected to the battery minus terminal 233 in the battery pack 2. The thermistor connecting terminal 243 is connected to the thermistor terminal 232 in the battery pack 2. The mobile phone terminal 240 also has an external power supply input terminal 230 connecting the mobile phone terminal 240 with external power supply such as an AC adapter that transforms and rectifies commercial alternating power supply.

The mobile phone terminal 240 has a charge processor 210 controlling charging of the battery pack 2. The charge processor 210 is integrally formed, for example, of an integrated circuit (IC), and controls charging of a battery cell 52 inside the battery pack 2. When the battery cell 52 contained in the battery pack 2 is a lithium-ion rechargeable battery, the battery cell 52 is fully charged with combination of constant current charge and constant voltage charge. The charge processor 210 has a reference voltage output unit 201, current detecting unit 202, charge control unit 203, and temperature detector 200. The reference voltage output unit 201 applies reference voltage output to the thermistor connecting terminal 243 via a dividing resistor 204. When the mobile phone terminal 240 is connected to the battery pack 2, the reference voltage output by the reference voltage output unit 201 is divided between a dividing resistor 204 and thermistor 23, and the voltage at the dividing point thereof is detected by the temperature detector 200. The temperature detector 200 determines whether the detected voltage value exceeds the threshold, and transfers the resulting data to the charge control unit 203.

The mobile phone terminal 240 has a series circuit formed of a charge current detecting resistor 205 and charge control transistor 206 connected between the external power supply input terminal 230 and the plus terminal 241. The current detector 202 gauges the current flowing in the charge current detecting resistor 205 and transfers the gauged current data to the charge control unit 203. The charge control unit 203 controls a charge control transistor 206 based on the data transferred from the current detector 202 and temperature detector 200.

When the mobile phone terminal 240 charges the battery pack 2, the charge processor 230 retains the charge control transistor ON. When the mobile phone terminal 240 stops charging of the battery pack 2, the charge processor 230 turns the charge control transistor 206 OFF to disconnect electric connection between the external input terminal 230 and the battery plus terminal 241. When neither charge current detected nor temperature detected are normal, the mobile phone terminal 240 turns the charge control transistor 206 OFF to stop charging of the battery pack 2.

The mobile phone terminal 240 utilizing the battery pack 2 having such related-art configuration detects the temperature using the thermistor 23 inside the battery pack 2, which implies that analog signals are flowing in the termister terminal 232.

In the related-art configuration of the battery pack 2 shown in FIG. 1, the mobile phone terminal controls charging of the battery pack 2 based on the temperature detected inside the battery pack 2. However, an intelligent battery pack is now provided as a more sophisticated battery pack. Such an intelligent battery pack includes an electric circuit that manages the battery condition, and communicates with the mobile phone terminal. FIG. 2 is a block diagram illustrating electric connections between the related art intelligent battery pack 5 and a mobile phone terminal 240.

Description of components identical to those illustrated in FIG. 1 is omitted. A mobile phone terminal 240' in FIG. 2 has a serial interface (SIF) 212 in addition to the components of the mobile phone terminal 240 in FIG. 1, via which a counterpart connected to the terminal 243 (i.e., intelligent battery pack 5) communicates with a central processing unit (CPU) 211 to control the components of the mobile phone terminal 240'. CPU 211 has a memory 213 connected thereto that stores computer programs and data. CPU 211 controls a liquid crystal display (LCD) 214 that displays various types of display, such as notification of the remaining battery capacity for the mobile phone terminal.

The intelligent battery pack 5 includes a fuel level gauge processor 50 (hereinafter referred to as "FG processor") that gauges voltage, current, and temperature in the battery cell 52, and protection processor 51 that controls the processing of transferring the data from FG processor 50 to the mobile phone terminal 240' and controls a switch 54 for charge and discharge of the battery cell. A current gauging resistor 53 and switch 54 are connected between the battery cell 52 and the battery minus terminal 233.

FG processor 50 gauges the voltage of one-cell battery 52 with a voltage gauge unit 500. FG processor 501 further gauges the temperature of one-cell battery 52 with a temperature gauge 501. FG processor 501 still further gauges potential at both ends of the current gauging resistor 53 with the current gauge 502 and gauge the current when charge and discharge current. A multiplexer 503 carries out time-division multiplexing on the obtained results, supplies the multiplexed data to an analog-to-digital converter 504 to convert the data into digital data, and then supplies to the resulting data to CPU 505. CPU 505 is connected to a memory 506 on which a computer program for control is recorded, and determines whether the obtained data is normal.

The results determined by CPU 505 is transferred to a level converter (L/S) 510 inside the protection processor 51 via serial interface (SIF) 507, and the level converter (L/S) 510 converts the results into the level of data adequate for transmitting it to the mobile phone terminal 240' and output the resulting data to a thermistor data communication terminal 234.

As shown in FIG. 2, the intelligent battery pack 5 further includes the thermistor 23 that is connected between the thermistor data communication terminal 234 and the battery minus terminal 233.

In a case where the intelligent battery pack 5 having a configuration shown in FIG. 2 is connected to the mobile phone terminal 240', the charge processor 210 is capable of controlling charging of the battery pack based on the temperature detected via the thermistor 23 in the mobile phone terminal 240'. Further, CPU 211 is capable of controlling discharge from the intelligent battery pack 5 based on the battery status detected by FG processor 50 inside the battery pack 5. In this case, communication between the battery pack 5 and mobile phone terminal 240' is carried out using the thermistor terminal in the battery pack shown in FIG. 1 without modification; that is, the communication therebetween is relatively easily carried out with existing configuration.

Japanese Unexamined Patent Application Publication No. 2006-155922 discloses a configuration of the battery pack of this type.

SUMMARY OF THE INVENTION

In the intelligent battery pack having the configuration shown in FIG. 2, digital signal for data communication on which an analog signal for the thrmistor is superimposed is used as a signal transmitted between the intelligent battery pack and mobile phone terminal via the thermistor. As a result, the temperature detector in the mobile phone terminal may not detect temperature accurately in some conditions.

Specifically, as shown in FIG. 2, the temperature detector 200 in the mobile phone terminal 240' detects temperature anomaly by detecting the voltage value that has been divided between the thermistor 23 and voltage dividing resistor 204. However, there is a possible change in the voltage detected by the temperature detector 200 due to the effect from data transmitted between L/S 510 of the intelligent battery pack 5 and SIF 212 of the mobile phone terminal, and hence the charge processor 210 may not properly carry out charging control. It is preferable that a communication terminal be used for connecting the mobile phone terminal with battery pack other than the thermistor terminals.

However, if data communication terminals are separately provided while leaving thermistor terminals 234, 243 to be used, manufacturing cost may increase due to increase in the number of terminals, or reliability in detecting temperature may decrease. Similar drawbacks may be present in terminals utilizing a rechargeable battery other than the mobile phone terminals.

Thus, embodiments of the invention intend to provide a mobile terminal and a charging system capable of detecting temperature accurately without increasing the number of terminals when an intelligent battery pack is attached to a terminal such as a mobile phone terminal in data communication.

According to the embodiments of the invention, the mobile terminal includes, as terminals for connecting the mobile terminal to the battery pack, a positive terminal connected to a positive electrode of a battery pack; a negative terminal connected to a negative electrode of the battery pack; and a data communication terminal communicating with components in the battery pack. The mobile terminal further includes a charge control unit controlling charging of the battery pack via the positive terminal; a reference voltage output unit outputting reference voltage; a dividing resistor and a thermistor connected in series between the reference voltage output unit and the negative terminal; and a temperature detector detecting temperature based on voltage at a predetermined portion of a series circuit formed of the dividing resistor and the thermistor to stop charging of the battery pack, based on the detected temperature, by the charge control unit. The mobile terminal further includes a switching device connected to a portion of the series circuit formed of the dividing resistor and the thermistor, and a control unit controlling the voltage of the predetermined portion. The control unit communicates with components inside the battery pack via the data communication terminal, and changes the voltage of the predetermined portion of the circuit, when abnormality in the battery pack is notified, by controlling the switching device.

According to the embodiments of the invention, the mobile terminal incorporates the thermistor, terminals connecting the battery pack and the mobile terminal other than positive and negative terminals are configured to only carry out communication. Accordingly, the abnormality can be controlled based on temperature detected by a thermistor and a battery condition monitored via communication with the battery pack, as similar to the related art configuration of the mobile terminal and charging system.

According to the embodiments of the invention, with a simple configuration having only the communication terminals other than positive and negative terminals, the abnormality can be controlled based both on temperature detected by a thermistor and battery condition monitored via communication with the battery pack, as the related art configuration of the mobile terminal and charging system. Since temperature is detected by the thermistor in the mobile terminal while no advert effect from signals transmitted via communication terminals is applied, charging of the battery or the like can securely be controlled based on the detected temperature. According to the embodiments, as a circuit configuration for detecting temperature by a thermistor in the mobile terminal, the related art circuit configuration for detecting temperature by thermistor located in the battery pack side can directly be used without modification, thereby producing a mobile terminal with simple configuration.

DESCRIPTION OF THE PREFERRED EMBODIMENTS

An embodiment of the invention will be described below with reference to FIGS. 3 to 7. The mobile phone terminal is employed as one example of the mobile terminal to which the embodiment of the invention is applied.

Figure 4:
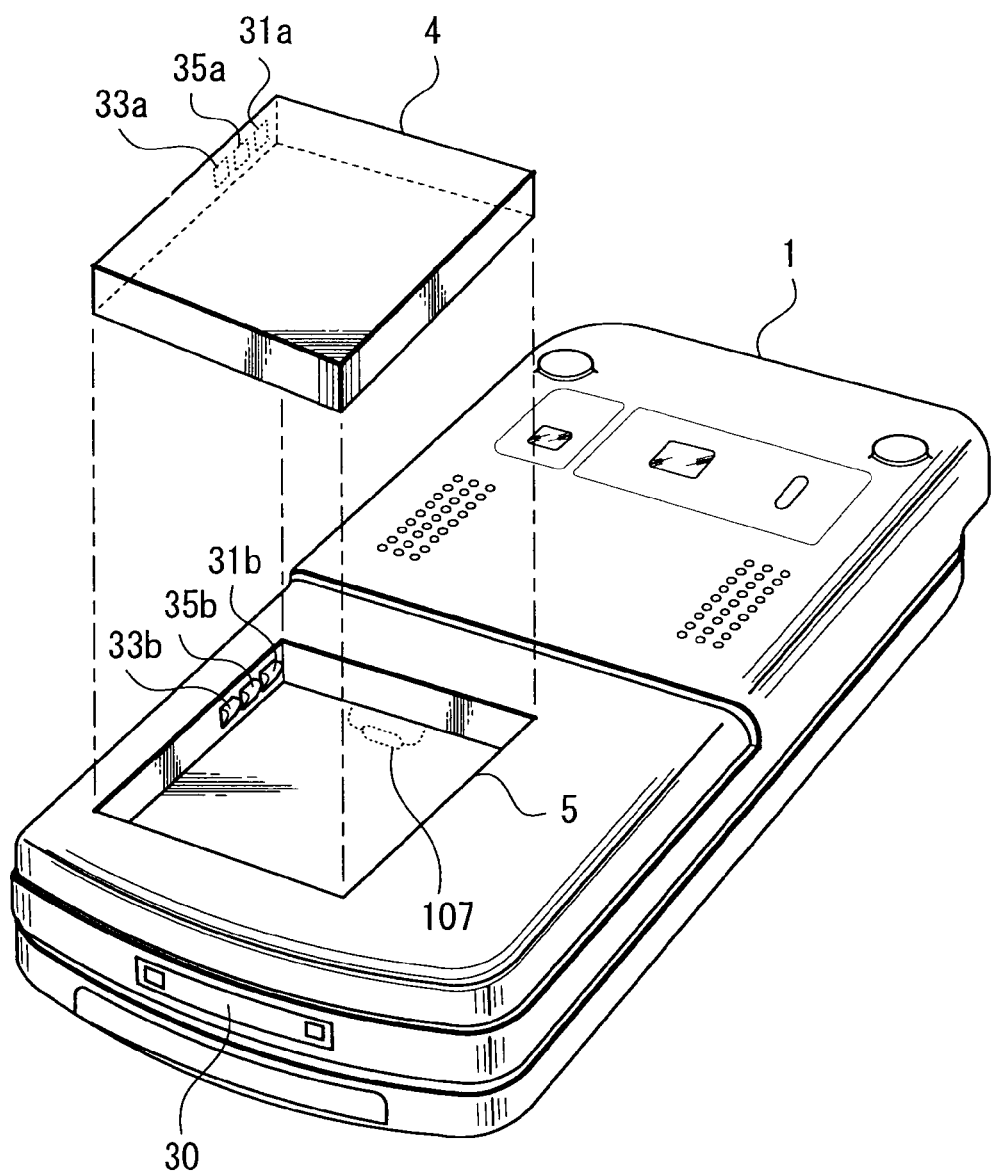
FIG. 4 is a perspective view illustrating an example of a mobile phone terminal and intelligent battery pack according to an embodiment of the invention.

FIG. 4 is a perspective view illustrating a configuration of a mobile phone terminal to the back side of which an intelligent battery pack 4 is attached according to the embodiment of the invention.

In FIG. 4, a mobile phone terminal 1 includes a battery housing 5 for housing the intelligent battery pack 4 on the back surface thereof, and the battery housing 5 includes a battery plus terminal 31b, data communication terminal 35b, and battery minus terminal 33b for electrically connecting with the intelligent battery pack 4.

A thermistor 107 utilized as a temperature detector for measuring the temperature of the intelligent battery pack 4 is attached to the internal surface of the battery housing 5 of a mobile terminal case. An external power supply input terminal 30 is provided at the end surface of the mobile phone terminal case for connecting the mobile phone terminal 1 with an external power supply such as an AC adapter, not shown.

The intelligent battery pack 4 includes a battery plus terminal 31a, data communication terminal 35a, and battery minus terminal 35a provided in locations corresponding to the battery plus terminal 31b, data communication terminal 35b, and battery minus terminal 33b of the battery housing 5 in the mobile phone terminal 1, respectively. When the intelligent battery pack 4 is housed in the battery housing 5 of the mobile phone terminal 1, the terminals are mutually brought into contact, thereby electrically connecting the intelligent battery pack 4 with the mobile phone terminal 1. A region around the battery housing 5 on the back surface of the mobile phone terminal 1 shown in FIG. 4 is covered with a battery cover, not shown.

Next, an electric connections configuration between the intelligent battery pack 4 and the mobile phone terminal 1 when the intelligent battery pack 4 is housed in the battery housing 5 of the mobile phone terminal 1 is described with reference to the block diagram of FIG. 3. The configuration of the mobile phone terminal 1 shown in FIG. 3 merely illustrates that relating to the control of the battery pack 4, and communication circuits or the like thereof for wireless communication required as a mobile phone terminal are omitted.

Figure 3:
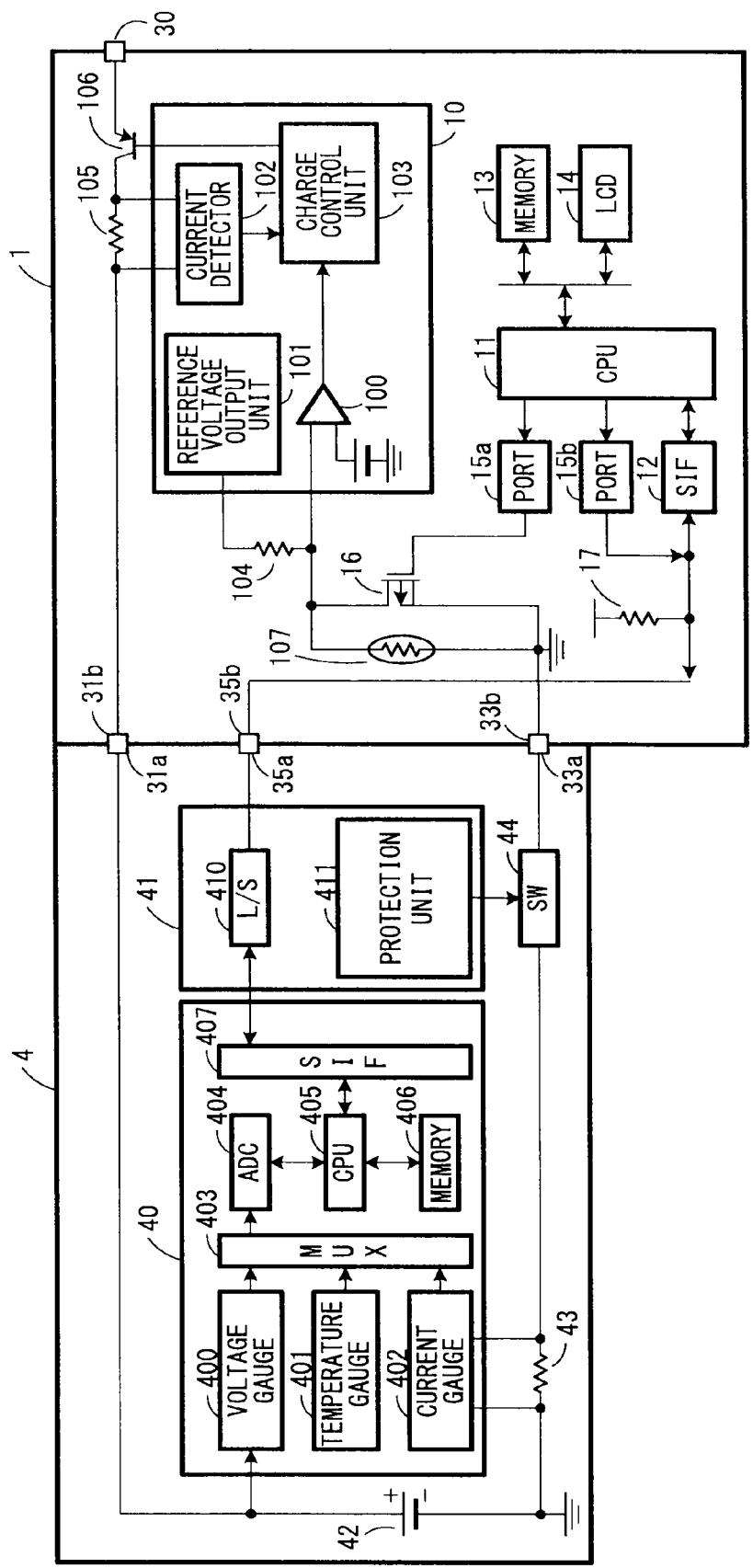
FIG. 3 is a block diagram illustrating an example of electric connections configuration between a mobile phone terminal and intelligent battery pack according to an embodiment of the invention.

As shown in FIG. 3, the intelligent battery pack 4 includes a battery cell 42 formed of a rechargeable battery, and the battery plus terminal 31a is connected to a positive electrode of the battery cell 42. A negative electrode of the battery cell 42 is connected to a battery minus terminal 33a via a current gauging resistor 43 and a switch 44. An example of the rechargeable battery forming the battery cell 42 includes a lithium-ion rechargeable battery.

The intelligent battery pack 4 further includes a fuel gauge processor (hereinafter referred to as "FG processor") 40 that gauges the voltage, current, and temperature of the battery cell 42. The intelligent battery pack 4 still further includes a protection processor 41 that transfers the data from FG processor 40 to the mobile phone terminal 1, and also controls the switch 44. FG processor 40 and protection processor 41 may each be formed as an integrated circuit (IC).

FG processor 40 includes a voltage gauge 400 gauging the voltage of the battery cell 42, a temperature gauge 401 gauging the temperature of the battery cell 42, a current gauge 402 gauging the current flown in the current gauging resistor 43.

The results obtained by the voltage gauge 400, temperature gauge 401, and current gauge 402 are supplied to an analog-to-digital converter (hereinafter referred to as "ADC") 404 via a multiplexer (MUX) 403. For example, the results obtained by the voltage gauge 400, temperature gauge 401, and current gauge 402 are each supplied in time-division from the multiplexer 403 to ADC 404. The data converted by ADC 404 is transferred to a control processing unit (CPU) 405 described later. The resulting data obtained by CPU 405 is transferred to a serial interface (hereinafter referred to as "SIF") 407 for data communication.

CPU 405 computes remaining battery capacity based on the data obtained from ADC 404. A memory 406 stores software including arithmetic algorithm for computing the remaining battery capacity or data digitized by ADC 404.

The protection processor 41 includes a level converting circuit (L/S) 410 that converts the level of a digital signal transmitted from SIF 407 into a receivable level thereof by the mobile phone terminal 1, and supplies the converted level of the signal to the data communication terminal 35a. The protection processor 41 includes a protection unit 411 that controls the switch 44. Specifically, the protection unit 411 turns OFF the switch 44 to carry out protection operation when notified abnormality from FG processor 40 to the protection processor 41.

Next, a configuration of the mobile phone terminal 1 of the embodiment to which the intelligent battery pack 4 is attached will be described. The mobile phone terminal 1 has a series circuit formed of a charge current detecting resistor 105 and charge control transistor 106 connected between the external power supply input terminal 30 and the plus terminal 31b. The current detector 102 inside the charge processor 10 detects the current flowing in the charge current detecting resistor 105 and transfers the detected current data to the charge control unit 103. The charge control unit 103 controls a charge control transistor 106 based on the results obtained from the current detector 102 and temperature detector 100. A configuration of the temperature detector 100 detecting temperature will be described later.

When the mobile phone terminal 1 charges the battery pack 4, the charge processor 10 retains the charge control transistor 106 ON. When the mobile phone terminal 1 stops charging of the battery pack 4, the charge processor 10 turns the charge control transistor 106 OFF to disconnect electric connection between the external input terminal 30 and the battery plus terminal 31b. When neither charge current detected nor temperature detected are normal, the mobile phone terminal 1 turns the charge control transistor 106 OFF to stop charging of the battery pack 4. In a case where the battery cell 42 of the intelligent battery pack 4 is a lithium-ion rechargeable battery, the charge processor 10 controls to fully charge or approximately fully charge the battery cell 42.

Figure 1:
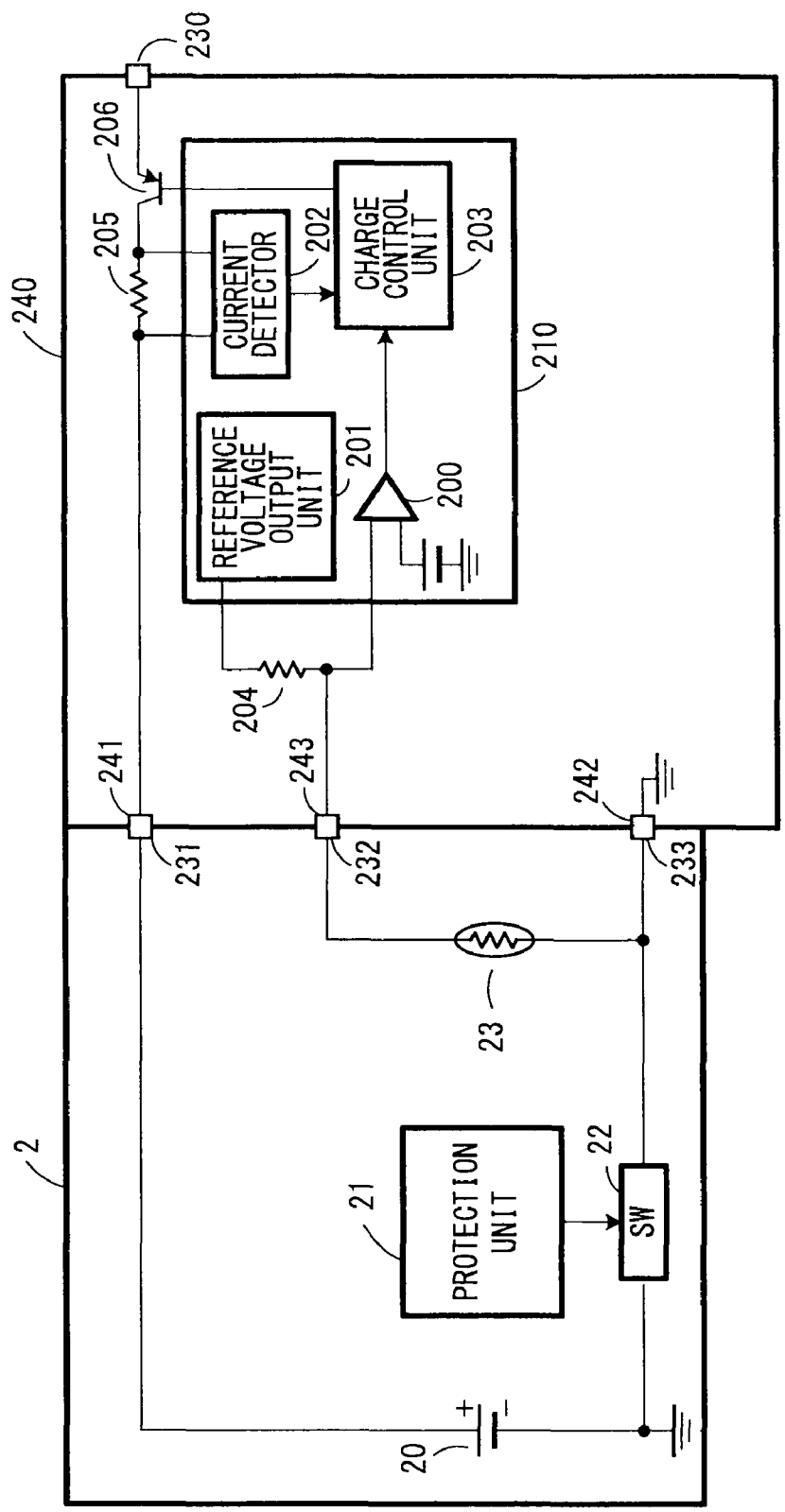
FIG. 1 is a block diagram illustrating an example of electric connections between the related art mobile phone terminal and battery pack.
Figure 2:
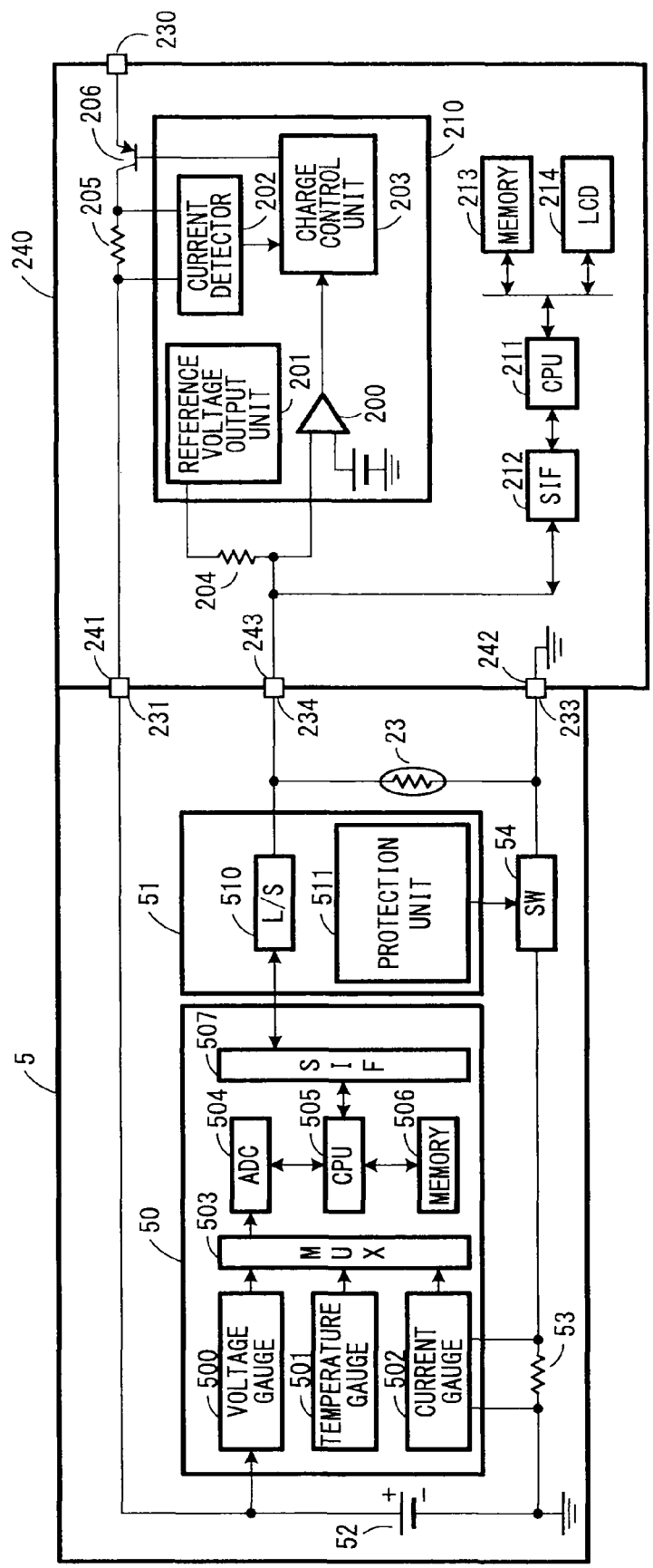
FIG. 2 is a block diagram illustrating an example of electric connections between the related art mobile phone terminal and intelligent battery pack.

The temperature detector 100 in the mobile phone terminal 1 is configured to detect temperature with the thermistor 107 attached to the internal surface of the battery housing 5 of the mobile phone terminal 1 shown in FIG. 4. As shown in FIG. 3, one end of the thermistor 107 is connected to the battery minus terminal 33*b*, and the other thereof is connected to one end of the voltage dividing resistor 104. The reference voltage is supplied from the reference voltage output unit 101 of the charge processor 10 to the other end of the voltage dividing resistor 104. The temperature detector 100 detects the voltage at a connection node between the thermistor 107 and the voltage dividing resistor 104. The temperature detector 100 determines whether the detected voltage value exceeds the threshold, and transfers the resulting data to the charge control unit 103. The charge control unit 103 determines whether the temperature of the battery pack 4 is normal based the detected voltage value exceeding or not exceeding the threshold, and controls the charging of the battery pack 4. The configuration of the charge processor 10 is identical to that of the charge processor 110 of the related art shown in FIGS. 1 and 2. Accordingly, the related art integrated circuit utilized for charging can be used as the charge processor 10 of this embodiment without modification.

A transistor 16 utilized as a switching device is connected in parallel with the thermistor 107. ON or OFF operation of the transistor 16 is controlled by a signal supplied via a port 15*a* from CPU 11 that controls operation of the mobile phone terminal 1. When the transistor 16 is turned ON, the thermistor 107 is forcefully short-circuited. The transistor 16 is turned OFF in normal state and turned ON only in abnormal state. ON state of the transistor 16 indicating the abnormal state will be described later.

Next, a configuration of CPU 11 for controlling the operation of the mobile phone terminal 1 that communicates with the intelligent battery pack 4 is described.

The data communication terminal 35*b* of the mobile phone terminal 1 is connected to SIF 12 via data communication terminal 35*a* as an interface for communicating with the intelligent battery pack 4. A pull-up resistor 17 for controlling the digital signal level of the data communication terminal 35*b* is connected between the data communication terminal 35*b* and SIF 12. A port 15*b* is also provided for outputting a signal that enables data communication via data communication terminal 35*b*, and outputs an appropriate signal by the control of CPU 11.

When CPU 11 of the mobile phone terminal 1 determines, based on the result of communication with the intelligent battery pack 4 via the data communication terminal 35*b*, that charge or discharge of the battery pack needs stopping, CPU 11 controls the transistor 16 to be turned ON. Specifically, when CPU 11 determines, based on the data communication via data communication terminal 35*b*, that there occurs some abnormal condition in the intelligent battery pack 4, CPU 11 turns the transistor 16 ON, and then short-circuits the thermistor 107.

As a result of the short-circuit of the thermistor 107, the temperature detector 100 of the charge processor 10 detects the voltage corresponding to temperature anomaly, based on the result of which the charge control unit 103 turns the charge control transistor 106 OFF to stop charging. As illustrated in FIG. 3, CPU 11 controlling operation of components of the mobile phone terminal 1 is connected to circuits via an internal bus inside the mobile phone terminal 1. For example, CPU 11 is connected to a memory 13 on which a computer program for controlling operation of the mobile phone terminal and various data are recorded, and controls reading of the recorded data from and writing data on the memory 13. CPU 11 also controls a liquid crystal display (LCD) 14 to display the data or the like. For example, the display 14 displays the remaining battery capacity, time of day, or incoming e-mail notification. The display 14 can also display abnormality of the battery.

Next, operation of charging of the intelligent battery pack 4 when the intelligent battery pack 4 is attached to the mobile phone terminal 1 of the embodiment is described. As illustrated in FIG. 3, the thermisor 107 is connected between the battery minus terminal 33 and the temperature detector 100 in this embodiment. Specifically, temperature detecting processing is carried out using the thermistor 107 incorporated in the mobile phone terminal 1.

An analog signal output by the thermistor 107 will not be superimposed on the signal used for CPU 11 to receive data from the intelligent battery pack 4, which is output by the data communication terminal 35*a*. Thus, the mobile phone terminal 1 securely receives the data from the intelligent battery pack 4 via the data communication terminal 35. Further, the voltage value in proportion to temperature detected by the temperature detector 100 of the charge processor 10 will not be affected by the signal transferred from the data communication terminal 35. Thus, CPU 11 can control charging of the intelligent battery pack 4 based on the temperature accurately detected.

The external power supply input terminal 30 of the mobile phone terminal 1 is connected to an external power supply such as AC adapter to supply the power for charging to the mobile phone terminal 1. The charge current is flown from the external power supply input terminal 30 to the battery cell 42 via the battery plus terminal 31.

The charge processor 10 charges the intelligent battery pack 4 by turning the charge control transistor 106 ON to conduct current if the charge current flown in the charge current detecting resistor 105 of or the temperature at a portion where the thermistor 107 is in contact (with the intelligent battery pack 4) detected by the temperature detector 100 is in a predetermined range.

In the intelligent battery pack 4, the temperature of the battery cell 42 is gauged by FG processor 40. FG processor 40 closed to the battery cell 42 so that FG processor 40 can gauge the temperature of the battery cell 42. The temperature gauged by FG processor 40 is transferred to CPU 11 via L/S 410, data communication terminal 35*a*, and SIF 12 of the mobile phone terminal 1.

Since the temperature gauge 401 of FG processor 40 is located closer to the battery cell 42 than to thermistor 107, the temperature of the battery cell 42 gauged by FG processor 40 is more accurate than that gauged by the thermistor 107 of the mobile phone terminal 1. Thus, CPU 11 can accurately determine, based on the temperature information obtained by communication between the intelligent battery pack 4 and CPU 11, whether the temperature detected is in a range in which charging needs stopping. When CPU 11 has determined that charging needs stopping, CPU 11 immediately stops charging of the battery pack.

When CPU 11 stops charging of the battery pack, CPU 11 turns the transistor 16 ON to get conductive, and short-circuits both ends of the thermistor 107.

When both ends of the thermistor 107 are short-circuited, the voltage applied to the temperature detector 100 exceeds the limit of the voltage corresponding to the appropriate operating temperature limit. The temperature detector 100 can thus detect temperature anomaly in this manner.

In the circuit shown in FIG. 3, the voltage output from a reference voltage generator 101 is divided between a division resistance 104 and the thermistor 107. When both ends of the thermistor 107 are short-circuited to lower the resistance value, the grounding potential, which is a voltage of approximately 0 V, is applied to the temperature detector 100. Since the voltage applied to the temperature detector 100 varies in the voltage range corresponding to the appropriate operating temperature range at both ends of the thermistor 107, temperature anomaly can be detected by the temperature detector 100.

Thus, the charge control unit 103 turns the charge control transistor 106 OFF to disconnect the electric connection between the external power supply and the battery plus terminal 31b, and stops charging of the intelligent battery pack 4. When the charge control unit 103 has stopped charging the battery pack, the detected temperature anomaly can be displayed on LCD 14.

Next, operation of the intelligence pack 4 in a low power consumption mode to lower power consumption is described. In the intelligent battery pack 4 in the low power consumption mode, circuits other than the protection unit 411, level converter 410, SIF407, and CPU 405 are not operated.

Accordingly, to obtain the temperature information gauged by the temperature gauge 401 of the intelligent battery pack 4, unoperated circuits such as the protection unit 411, ADC 404, MUX 403, voltage gauge 400, temperature gauge 401, and current gauge 402 may need to be activated.

Usually, the mobile phone terminal 1 outputs a high-level voltage via the port 15b regardless of activation of the intelligent battery pack 4. However, to resume the intelligent battery pack 4, a low-level signal is output via the port 15b as a triggering signal.

The low-level signal is output to the protection processor 41 via the data communication terminal 35b. The protection processor 41 controls a level of the signal received from the data communication terminal 35b to be match with the level of the signal processed by FG processor 40, and transfers the resulting signal to the level converter 410 which is an interface of FG processor 40.

CPU 405 of FG processor 40 activates ADC 404, MUX 403, and temperature gauge 401 based on the low-level signal received from SIF 407. Accordingly, the intelligent battery pack 4 is shifted to the normal mode from the low power consumption mode to transfer data such as temperature to the mobile phone terminal 1.

The components that are reactivated based on the low-level signal received from SIF 407 are not limited to ADC 404, MUX 403, and temperature gauge 401; however, the voltage gauge 400 and current gauge 402 may also be reactivated simultaneously with ADC 404, MUX 403, and temperature gauge 401.

Thus, since the thermistor used to be located in the intelligent battery pack 4 in the related art is located in the mobile phone terminal 1, and the mobile phone terminal 1 and intelligent battery pack 4 are connected via the original three terminals; that is, the battery plus terminal 31, data communication terminal 35, and battery minus terminal 33 as the related art configuration, an analog signal will not be superimposed on the digital signal output from the data communication terminal in this embodiment.

Since only data communication signals are transmitted in the data communication terminal 35b, invalid detection detected by the temperature detector 100, while communicating data via the data communication terminal 35b in the related art, can be suppressed.

Further, even when data communication is not reliably carried out or CPU 11 is not operated properly, since the thermistor 107 is placed in the mobile phone terminal 1, the charge processor 10 can still gauge the temperature of the intelligent battery pack 4 detected by the thermistor 107. Moreover, in a case where the battery anomaly is notified to CPU 11 from the intelligent battery pack 4 via communication between the intelligent battery pack 4 and CPU 11 of the mobile phone terminal 1, since CPU 11 can control the transistor 16 connected in parallel with the thermistor 107 and allows the temperature detector 100 in the charge processor 10 to detect temperature anomaly, CPU 11 can control charge and discharge of the battery pack based on the result from the intelligent battery pack 4. As a result, the configuration in which the charge and discharge of the battery pack may be simplified in the mobile phone terminal 1. Further, since the charge processor 10 can have an identical circuit configuration of the charge processor (examples of charge processor 210 in FIGS. 1 and 2) of the related art that controls charge and discharge of the thermistor incorporating battery pack, and the integrated circuit for charge control incorporated in the mobile phone terminal of the related art can be employed in this embodiment without modification, the mobile phone terminal can be made at a lower cost.

Figure 5:
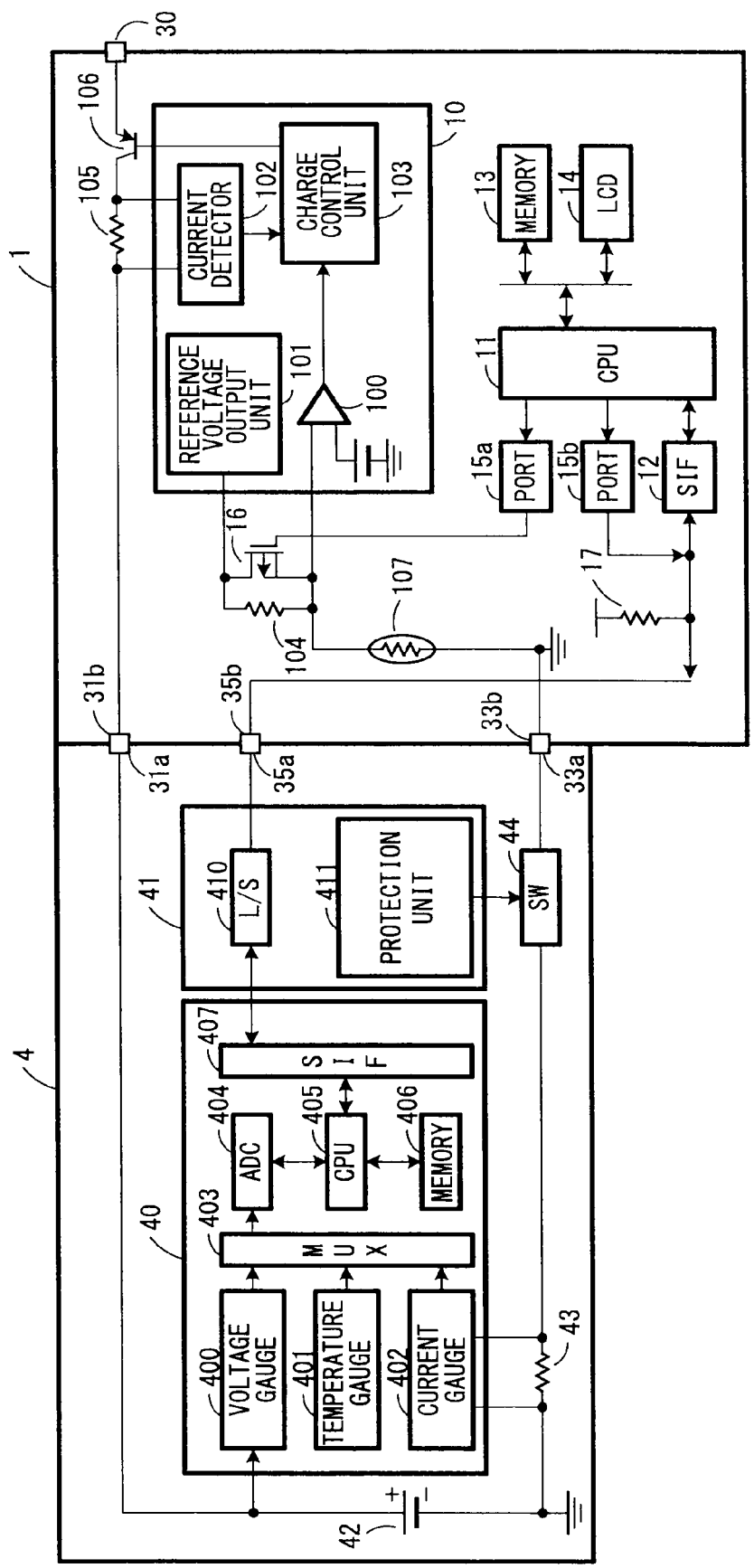
FIG. 5 is a block diagram illustrating a first modification according to the embodiment of the invention.
Figure 6:
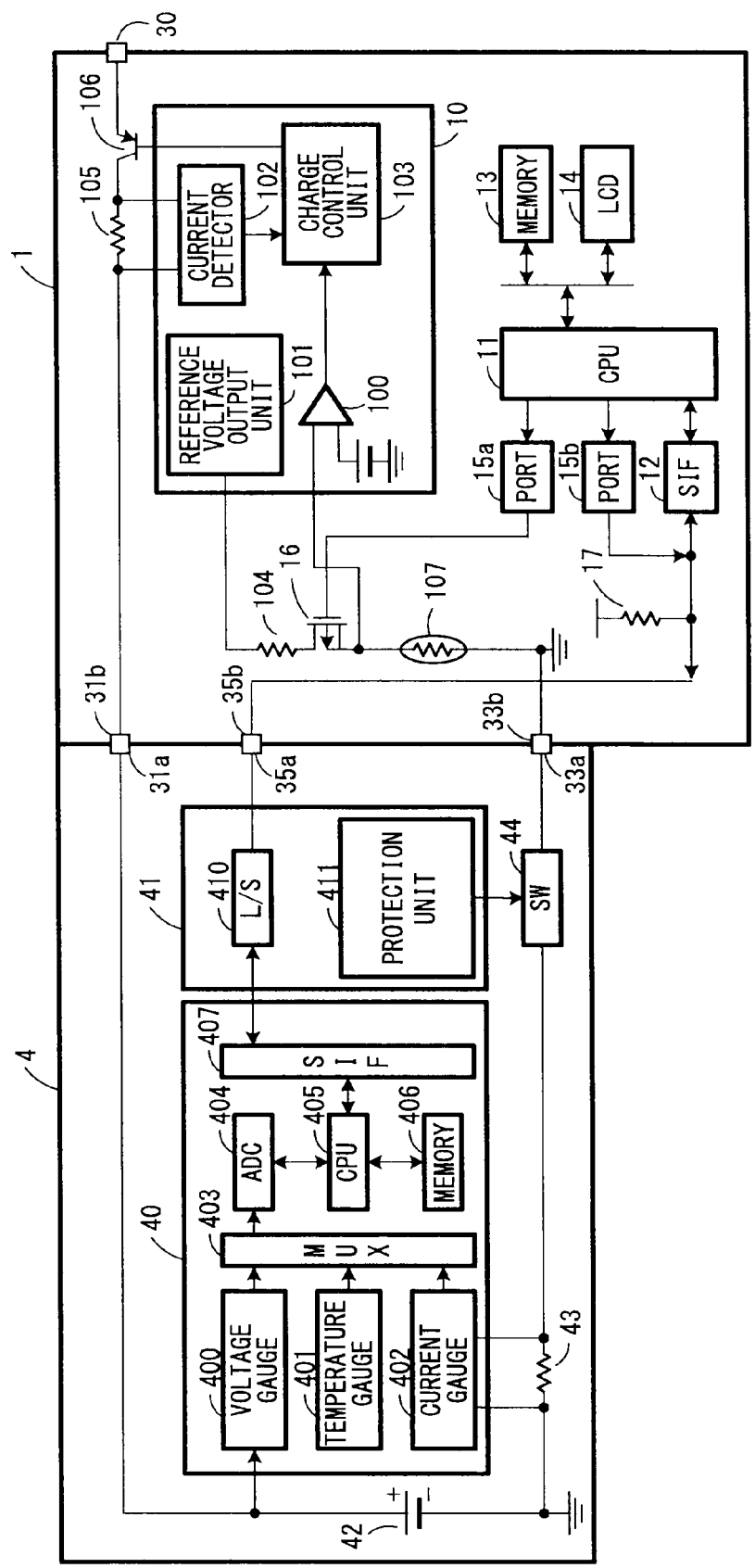
FIG. 6 is a block diagram illustrating a second modification according to the embodiment of the invention.
Figure 7:
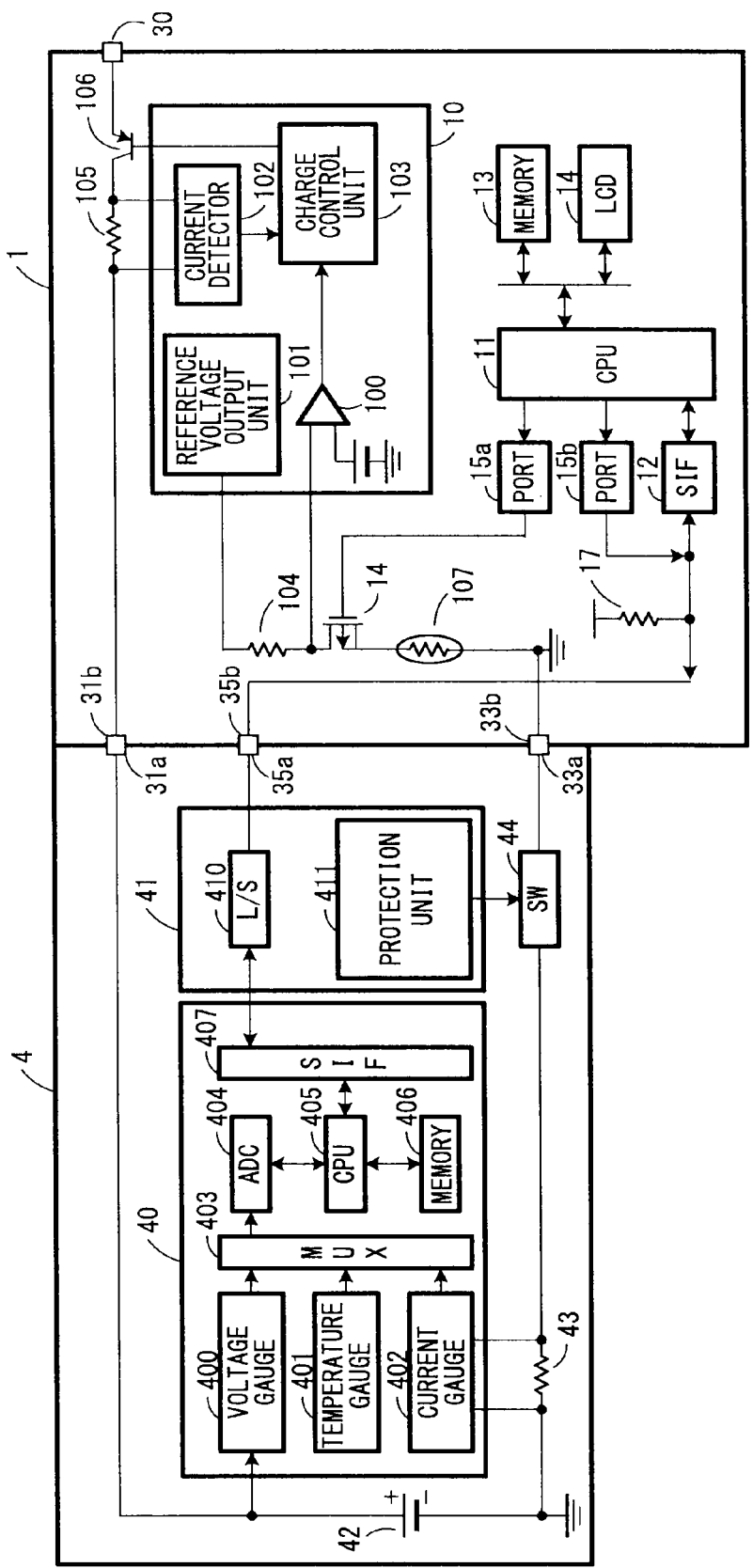
FIG. 7 is a block diagram illustrating a third modification according to the embodiment of the invention.

The switching device (example of transistor 16 in FIG. 3) that short-circuits the thermistor 107 shown in FIG. 3 may be connected to other positions in the mobile phone terminal 1 unless the voltage detected by the temperature detector 100 is substantially the same as the voltage normally detected therein. FIGS. 5 to 7 each illustrate examples where the transistor 16 is connected to other positions in the mobile phone terminal 1.

FIG. 5 is a block diagram illustrating a first modification of this embodiment. Identical numerals are provided with the same components of the embodiment shown in FIG. 3. In FIG. 5, the difference between the first modification and the embodiment in FIG. 3 is a portion where the transistor 16 of the mobile phone terminal 1 is connected in parallel with the voltage dividing resistor 104. Specifically, in the embodiment shown in FIG. 3, the transistor 16 is connected in parallel with the thermistor 107 whereas in the modification shown in FIG. 5, the transistor 16 is connected in parallel with the voltage dividing resistor 104. Other components in FIG. 5 are formed as similar to those in FIG. 3.

In the first modification in FIG. 5, CPU 11 controls the transistor 16 to be turned ON when CPU 11 detects abnormality in the intelligent battery pack 4. At this moment, both ends of the voltage dividing resistor 104 are short-circuited. Since there is little voltage decrease occurred in the voltage dividing resistor 104, the voltage from both ends of the thermistor 107 is supplied to the temperature detector 100 without dividing the voltage output from the reference voltage output unit 100.

Accordingly, since the voltage applied to the temperature detector 100 has a value that exceeds the voltage range corresponding to the appropriate operating temperature range, the temperature detector 100 can detect temperature anomaly of the intelligent battery pack 4. The description of the charge control of the charge processor 10 is the same as that of the embodiment referred in FIG. 3. Further, the operation of the intelligent battery pack 4 in the low-power consumption mode is also the same as that of the embodiment referred in FIG. 3.

Next, a second modification will be described with reference to FIG. 6. Identical numerals are provided with the same components of the embodiment shown in FIG. 3. As shown in FIG. 6, the transistor 16 of the mobile phone terminal 1 is connected in series between the voltage dividing resistor 104 and thermistor 107. The temperature detector 100 detects the voltage of the connection node between the transistor 16 and thermistor 107.

In the second modification shown in FIG. 6, CPU 11 turns the transistor 16 ON in the normal condition, and turns the transistor 16 OFF in the abnormal condition of the intelligent battery pack 4. Specifically, the reference voltage output by the reference voltage output unit 101 is not applied to the temperature detector 100 in the abnormal condition. In this case, the voltage applied to the temperature detector 100 changes from the voltage obtained from both ends of the thermistor 107 to substantially the same potential as the grounding potential. Accordingly, since the voltage applied to the temperature detector 100 has a value that exceeds the voltage range corresponding to the appropriate operating temperature range, the voltage corresponding to temperature anomaly can be detected by the temperature detector 100.

Next, a third modification will be described with reference to FIG. 7. The difference between the third embodiment and second embodiment shown in FIG. 6 is a position to which the temperature detector 100 is connected. In the third modification shown in FIG. 7, the transistor 16 of the mobile phone terminal 1 is connected in series between the voltage dividing resistor 104 and thermistor 107. As shown in FIG. 7, the temperature detector 100 detects the voltage between the voltage dividing resistor 104 and the transistor 16.

In this case, when CPU 11 detects abnormal condition such as temperature anomaly via communication with the battery pack 4, CPU 11 controls the transistor 16 to be turned OFF. When no abnormal condition is detected, the transistor 16 continuously remains ON. In this case, the voltage applied to the temperature detector 100 in the abnormal condition is substantially 0 V. Accordingly, since the voltage applied to the temperature detector 100 has a value that exceeds the voltage range corresponding to the appropriate operating temperature range, the temperature detector 100 can detect temperature anomaly of the intelligent battery pack 4.

The embodiments described so far are examples of the mobile phone terminal that incorporates the intelligent battery pack; however, various mobile electronic apparatuses (mobile terminal) other than a mobile phone terminal may also incorporate the battery pack to control charge and discharge of the battery pack. The internal configuration of the intelligent battery pack shown in FIG. 3 is only one example, and other internal configurations for the intelligent battery pack may also be applied.

In the specific examples of the circuit configuration of the embodiments shown in FIG. 3 to FIG. 7, the temperature detector of the charge processor detects the battery anomaly by controlling ON and OFF of the transistor 16; however, switching devices other than the transistor 16 may also be employed for carrying out ON and OFF controls of such devices.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal incorporating a battery pack utilized as power supply, the mobile terminal comprising:
   a positive terminal connected to a positive electrode of the battery pack;
   a negative terminal connected to a negative electrode of the battery pack;
   a data communication terminal communicating with a circuit in the battery pack;
   a charge control unit controlling charging of the battery pack via the positive terminal;
   a reference voltage output unit outputting reference voltage;
   a dividing resistor and a thermistor connected in series between the reference voltage output unit and the negative terminal;
   a temperature detector detecting temperature based on voltage at a predetermined portion of a series circuit formed of the dividing resistor and the thermistor, and stopping charging of the battery pack with the charge control unit based on the detected temperature;
   a switching device connected to a portion of the series circuit formed of the dividing resistor and the thermistor, and controlling the voltage at the predetermined portion; and
   a control unit communicating with the circuit in the battery pack via the data communication terminal, and changing the voltage at the predetermined portion, when abnormality is notified from the battery pack, by controlling the switching device, wherein
   the switching device is connected in parallel with the thermistor, and the control unit controls the switching device to short-circuit the thermistor to change the voltage at the predetermined portion.

2. A mobile terminal incorporating a battery pack utilized as power supply, the mobile terminal comprising:
   a positive terminal connected to a positive electrode of the battery pack;
   a negative terminal connected to a negative electrode of the battery pack;
   a data communication terminal communicating with a circuit in the battery pack;
   a charge control unit controlling charging of the battery pack via the positive terminal;
   a reference voltage output unit outputting reference voltage;
   a dividing resistor and a thermistor connected in series between the reference voltage output unit and the negative terminal;
   a temperature detector detecting temperature based on voltage at a predetermined portion of a series circuit formed of the dividing resistor and the thermistor, and stopping charging of the battery pack with the charge control unit based on the detected temperature;
   a switching device connected to a portion of the series circuit formed of the dividing resistor and the thermistor, and controlling the voltage at the predetermined portion; and
   a control unit communicating with the circuit in the battery pack via the data communication terminal, and changing the voltage at the predetermined portion, when abnormality is notified from the battery pack, by controlling the switching device, wherein
   the switching device is connected in parallel with the dividing resistor, and the control unit controls the switching device to short-circuit the dividing resistor to change the voltage at the predetermined portion.

3. A mobile terminal incorporating a battery pack utilized as power supply, the mobile terminal comprising:
   a positive terminal connected to a positive electrode of the battery pack;
   a negative terminal connected to a negative electrode of the battery pack;

a data communication terminal communicating with a circuit in the battery pack;

a charge control unit controlling charging of the battery pack via the positive terminal;

a reference voltage output unit outputting reference voltage;

a dividing resistor and a thermistor connected in series between the reference voltage output unit and the negative terminal;

a temperature detector detecting temperature based on voltage at a predetermined portion of a series circuit formed of the dividing resistor and the thermistor, and stopping charging of the battery pack with the charge control unit based on the detected temperature;

a switching device connected to a portion of the series circuit formed of the dividing resistor and the thermistor, and controlling the voltage at the predetermined portion; and a control unit communicating with the circuit in the battery pack via the data communication terminal, and changing the voltage at the predetermined portion, when abnormality is notified from the battery pack, by controlling the switching device, wherein the switching device is connected in series between the thermistor and the dividing resistor, and the control unit controls the switching device to disconnect the thermistor from the dividing resistor to change the voltage at the predetermined portion.

4. The mobile terminal according to claim 1, wherein the battery pack includes a battery side control unit detecting a state of an incorporated rechargeable battery, a battery side positive terminal and a battery side negative terminal connected to a positive electrode and a negative electrode of the rechargeable battery, respectively, and a battery side data communication terminal under the control of the battery side control unit and configured to communicate with the mobile terminal.

* * * * *